M. KIMBEL.
TIRE ADJUSTER.
APPLICATION FILED FEB. 6, 1918.
1,307,131.
Patented June 17, 1919.
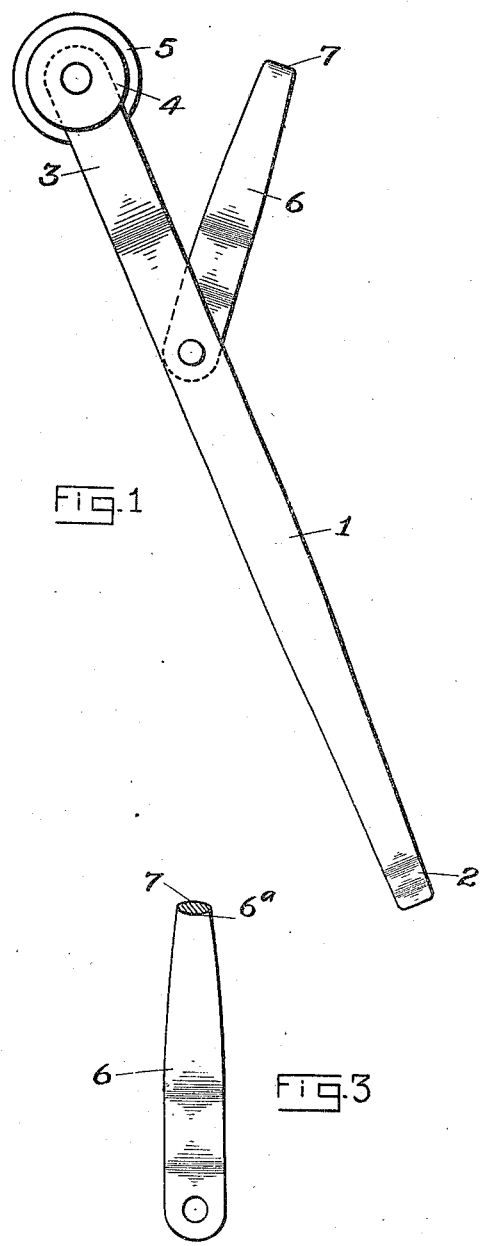
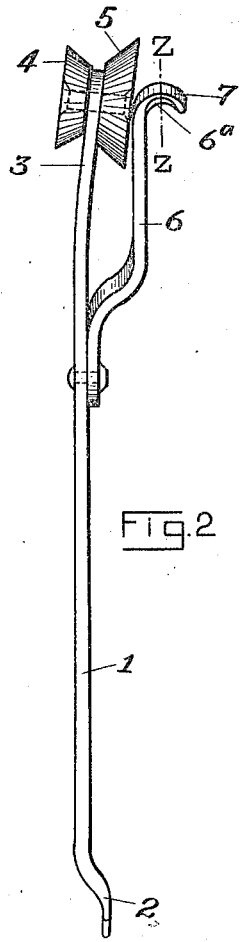
Martin Kimbel,
     Inventor.
By Lawrence Langner
         Attorney.

UNITED STATES PATENT OFFICE.

MARTIN KIMBEL, OF AUCKLAND, NEW ZEALAND.

TIRE-ADJUSTER.

1,307,131.     Specification of Letters Patent.     Patented June 17, 1919.

Application filed February 6, 1918. Serial No. 215,690.

*To all whom it may concern:*

Be it known that I, MARTIN KIMBEL, a subject of His Majesty the King of the United Kingdom of Great Britain and Ireland, resident of Kings Court, Upper Queen street, in the city of Auckland, in the Provincial District of Auckland and Dominion of New Zealand, have invented new and useful Improvements in a Tire-Adjuster for Motor Cars, Cycles, and the like, of which the following is a specification.

This invention relates to means employed in placing tires on and removing same from the wheels of motor cars, cycles and the like.

The object of the invention is to provide an inexpensive, convenient and efficient tool or tire jack for use as aforesaid, which will enable tires to be adjusted with a minimum of trouble.

The tool or jack consists of a suitable length of bar iron preferably tapered toward one end which is bent and formed similar to an ordinary tire lever. The other end of the tool is set at a slight angle, and mounted on each side of the latter end is a bevel wheel, one of the wheels being of a greater diameter than the other.

To the same side of the tool as that on which the larger bevel wheel is mounted, is pivoted a short arm hooked at its free end, and formed so as to clear the bevel wheel, mentioned. The short arm is secured to the tool at a point above the center of the latter, and the under or internal surface of the hooked end, is bellied or rounded in cross section.

The device will be particularly described with reference to the accompanying drawing in which:—

Figure 1 is a side elevation of the improved tool and

Fig. 2 an edge view thereof,

Fig. 3 being a sectional view of the short hooked arm, taken through Z. Z. Fig. 2.

In the drawing 1 represents the body portion of the tool or jack which consists of a suitable length of bar iron, tapered toward the end 2 the latter being shaped and formed so as to be capable of being used as an ordinary tire lever.

The upper end 3 of the tool is set at a slight angle to the body portion 1 as shown, and has mounted thereon bevel wheels 4 and 5, one on each side of the end 3. The wheel 5 is of a larger diameter than the wheel 4 and both of the wheels are mounted with their smallest diameter against the end 3.

At a point above the center of the body 1 a short arm 6 is pivoted on the same side as the wheel 5. The arm 6 is hooked at its upper end 7 and is bent to clear the wheel 5, the under or internal surface 6ª of the end 7 being bellied or rounded as shown in Fig. 3.

In using the tool the latter is opened out as in Fig. 1 and the hooked end 7 of the arm 6 caused to grip the wheel rim at one side of the tire valve which should always be first placed in its proper position.

The wheels 4 and 5 are made to engage the bead of the tire one on either side thereof the wheel 5 being on the inner side and bearing against the wheel rim, of the vehicle or cycle.

By imparting a short jumping or jerking motion to the end 2 of the tool the latter can be worked around the rim and the tire sprung or placed on the wheel with little trouble, the hooked end 7 of the arm 6 being slid around the rim and not being disengaged therefrom until the tire is in the desired position.

The end 2 is used as a tire lever either for taking off or replacing tires or as desired.

What I claim is:

1. A tire jack having one end set at an angle to the body portion, beveled wheels mounted one on each side of said end, and a hooked arm pivoted to said body portion substantially as described and illustrated.

2. A tire jack having one end set at an angle to the body portion, beveled wheels mounted one on each side of said end, one wheel being larger in diameter than the other, a short arm pivoted at one end to the body portion above the latter's center and hook shaped at its other end, said arm being on the same side of the body portion as the larger of the beveled wheels and shaped to clear the latter, substantially as described and illustrated.

3. A tire jack consisting of a body portion of bar iron, one end of which is tapered and bent to lie in a line parallel to said body portion and in a different plane therefrom, the other end being set at an angle to said body portion; beveled wheels of different diameters mounted one on each side of said set end, and each with its smaller diameter next said set end; a short arm pivoted at one end to said body portion above the latter's center, and hook shaped at its other end; said arm being on the same side of said body portion as the larger of said beveled wheels, and shaped to clear the latter.

MARTIN KIMBEL.

Witnesses:
 GEORGE WILLIAM BASLEY,
 ERNEST WILFRED BOYD CAREY.